United States Patent
Castorina et al.

(10) Patent No.: US 7,227,991 B2
(45) Date of Patent: Jun. 5, 2007

(54) METHOD FOR IMPROVING THE QUALITY OF A DIGITAL IMAGE

(75) Inventors: Alfio Castorina, Linera (IT); Massimo Mancuso, Monza (IT); Sebastiano Battiato, Acicatena (IT)

(73) Assignee: STMicroelectronics S.r.l. (IT)

( * ) Notice: Subject to any disclaimer, the term of this patent is extended or adjusted under 35 U.S.C. 154(b) by 643 days.

(21) Appl. No.: 10/323,589

(22) Filed: Dec. 18, 2002

(65) Prior Publication Data
US 2003/0218679 A1   Nov. 27, 2003

(30) Foreign Application Priority Data
Dec. 24, 2001   (EP)   ................................ 01830803

(51) Int. Cl.
*G06K 9/00*   (2006.01)
(52) U.S. Cl. .............. 382/167; 382/168; 382/169; 382/170; 382/260; 348/272; 358/3.26
(58) Field of Classification Search ................ 382/167, 382/164, 168, 169, 263, 274, 284, 260, 239, 382/302, 170; 348/272, 241, 220.1, 222.1, 348/302, 350, 247, 221.1; 707/1; 358/3.26
See application file for complete search history.

(56) References Cited

U.S. PATENT DOCUMENTS

| | | | | |
|---|---|---|---|---|
| 5,461,425 A * | 10/1995 | Fowler et al. | ............... | 348/294 |
| 6,049,626 A | 4/2000 | Kim | | |
| 6,292,218 B1 * | 9/2001 | Parulski et al. | .......... | 348/220.1 |
| 6,599,476 B1 * | 7/2003 | Watson et al. | ................ | 422/63 |
| 6,803,955 B1 * | 10/2004 | Yosida | ........................ | 348/272 |
| 6,898,331 B2 * | 5/2005 | Tiana | .......................... | 382/274 |
| 6,985,172 B1 * | 1/2006 | Rigney et al. | .............. | 348/149 |
| 2002/0044778 A1 * | 4/2002 | Suzuki | ........................ | 396/429 |
| 2002/0135743 A1 * | 9/2002 | Gindele | ........................ | 355/18 |
| 2003/0063807 A1 * | 4/2003 | Bruna et al. | ................. | 382/239 |
| 2003/0197793 A1 * | 10/2003 | Mitsunaga et al. | ....... | 348/222.1 |
| 2004/0105016 A1 * | 6/2004 | Sasaki | ...................... | 348/222.1 |
| 2005/0047675 A1 * | 3/2005 | Walmsley et al. | .......... | 382/263 |
| 2005/0200723 A1 * | 9/2005 | Kondo et al. | ............. | 348/222.1 |

FOREIGN PATENT DOCUMENTS

| | | |
|---|---|---|
| EP | 0 801 360 A2 | 10/1997 |
| EP | 0 877 339 A2 | 11/1998 |
| EP | 0 877 339 A3 | 11/1998 |

OTHER PUBLICATIONS

Naoki Kobayashi et al., "Fast Adaptive Contrast Enhancement Method for the Display of Gray-Tone Images" Systems and Computers in Japan, vol. 25, No. 13, 1994.

* cited by examiner

*Primary Examiner*—Matthew C. Bella
*Assistant Examiner*—Ali Bayat
(74) *Attorney, Agent, or Firm*—Lisa K. Jorgenson; Bryan A. Santarelli; Graybeal Jackson Haley LLP

(57) ABSTRACT

A method for improving the quality of a digital image acquired with a non-optimal exposure. In one embodiment, the method, which is applied directly to the image in CFA (Color Filter Array) format, identifies the regions of the image that are most important from the perceptive or contextual point of view by means of simple statistical measures. The image is then transformed by inverting the response function in such a manner as to optimize the quality of these regions.

22 Claims, 3 Drawing Sheets

METHOD FOR IMPROVING THE QUALITY OF A DIGITAL IMAGE

CROSS-REFERENCE TO RELATED APPLICATION

The present application claims priority from European patent application No. 01830803.1, filed Dec. 24, 2001, which is incorporated by reference.

TECHNICAL FIELD

The present invention concerns the processing of images in digital format and, more particularly, a method that can be advantageously used in digital still cameras for improving the quality of images acquired with a non optimal exposure.

BACKGROUND OF THE INVENTION

Digital still cameras (or DSCs) are currently among the devices most commonly employed for acquiring digital images. The fact that both sensors of ever greater resolution and low-cost and low-consumption digital signal processors (DSPs) are readily available in commerce has led to the development of digital still cameras capable of acquiring images of very considerable resolution and quality.

In these cameras, as also in traditional still cameras, a problem that is, as yet, difficult to solve is represented by estimating the best exposure to be used in the acquisition phase.

Exposure control, obtained by acting both on the size of the diaphragm aperture and the shutter timing, makes it possible to control the amount of light that strikes the sensor—and, more particularly, the photosensitive cells of which it is made up—during the acquisition. In digital still cameras there also exists the possibility of regulating the exposure by varying the gain or, analogously, the sensitivity of the photosensitive cells.

A correct exposure makes it possible to acquire images of a good and uniform tonality, to reproduce the contrast of the scene in an optimal manner and to render any lighting variations within the scene in the best possible way by exploiting the limited dynamic response of the acquisition instrument in an optimal manner. Indeed, given the finite number of bits available for the numerical representation of the pixels and also on account of the sensor characteristics, digital still cameras have a limited response to the luminance variations to be found in a given scene, that is to say, a limited dynamic range.

Modern digital still cameras utilize several techniques for automatically setting the exposure. These techniques are known as "exposure metering" and operate in conformity with a multitude of different criteria. All of them are, however, based on measurements that estimate the quantity of light associated with or incident on the scene that is to be acquired or on particular regions of that scene.

Some techniques are completely automatic, cases in point being represented by those based on "average/automatic exposure metering" or the more complex "matrix/intelligent exposure metering". Others, again, accord the photographer a certain control over the selection of the exposure, thus, allowing space for personal taste or enabling him to satisfy particular needs.

Notwithstanding the great variety of the known methods for regulating the exposure and notwithstanding the complexity of some of these methods, it is not by any means rare for images to be acquired with a non-optimal or incorrect exposure.

In any case, there does not exist a precise definition of the best exposure, because this depends both on the contents of the image and the personal taste of the observer. Given a scene that does not call for a particular exposure setting, it is possible to abstract a generalization and to define, as best, the particular exposure that enables one to reproduce the most important regions (deemed to be such in accordance with contextual or perceptive criteria) with a level of grey, or brightness, more or less in the middle of the possible range.

Optimal exposure therefore reproduces a digital image that, when represented in YCrCb format, is characterized in that the mean of the digital values of the luminance plane Y relating to the most important regions has a value approximately at the center of the range of the possible digital values.

Various so-called correction methods are known to obtain an improvement of the quality of the acquired image, generally by modifying the luminosity distribution within the image.

One of the most common of these is the so-called "histogram equalization", a method that has several known variants.

Histogram equalization, described in detail—among others—in U.S. Pat. No. 5,923,383, extracts from an image the histogram of the distribution of the digital values corresponding to the light intensity of the pixels and then, equalizing this histogram, produces an image of better quality.

A problem associated with this method—in common with other known exposure correction methods—is that it takes no account of the fact that in the image there exist regions that are more important from either a perceptive or a contentual point of view.

Furthermore, the methods known in the state of the art perform the correction by acting on the image after the interpolation process traditionally employed in digital still cameras for producing an image on three full-resolution planes starting from the single-plane colored CFA (Color Filter Array) image produced by the sensor. For this reason, the known correction methods are not optimized from the point of view of computation cost.

SUMMARY OF THE INVENTION

An embodiment of the present invention, therefore, sets out to propose an exposure correction method for improving the quality of digital or digitalized images acquired with a non-optimal exposure that is not subject to the drawbacks associated with the known methods.

According to an embodiment of the invention, this aim can be attained by a correction method as described in general terms below.

BRIEF DESCRIPTION OF THE DRAWINGS

The invention will be better understood from the detailed description of a particular embodiment given hereinbelow, the said embodiment being merely an example and should not therefore be regarded as in any way limitative, together with the accompanying drawings, of which.

DETAILED DESCRIPTION

Figure 1:
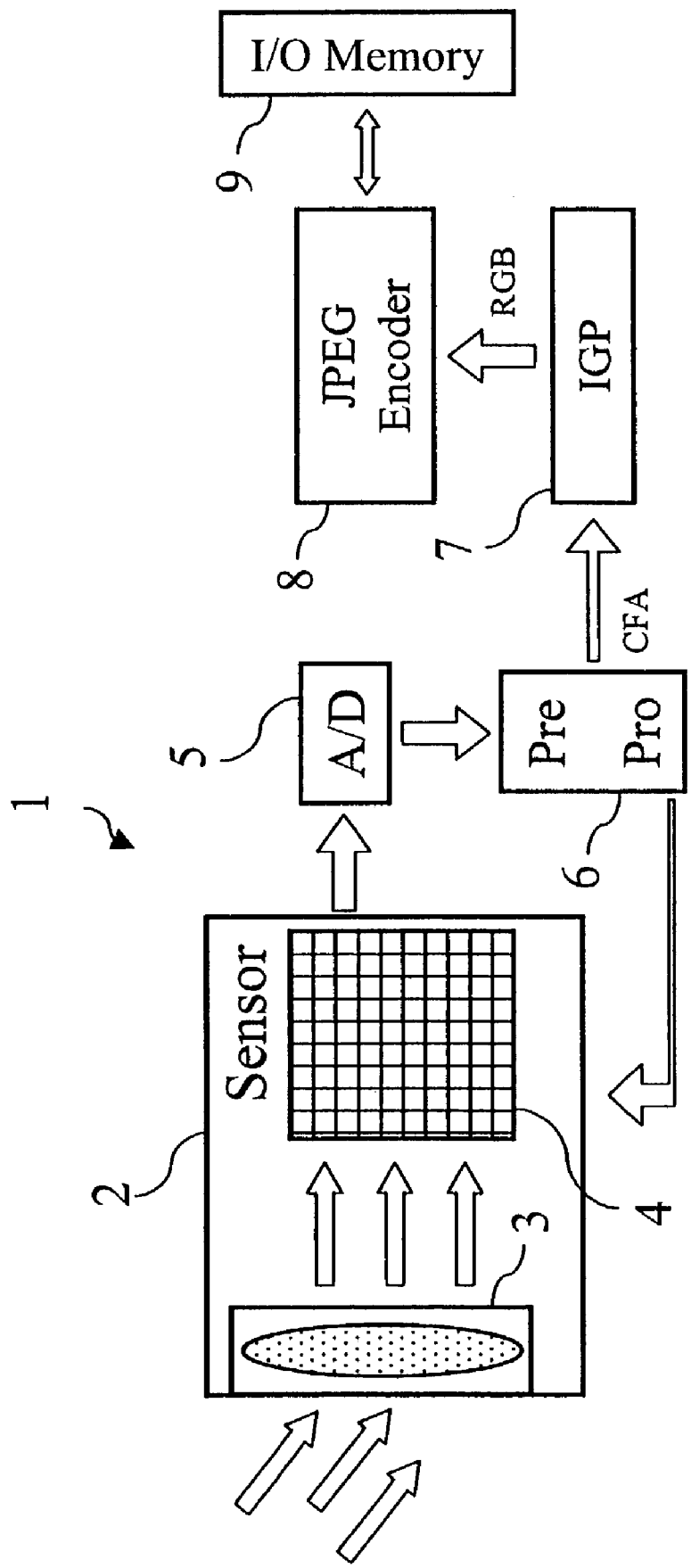
FIG. 1 shows the block logic scheme of an acquisition system employing the method in accordance with an embodiment of the invention.

Referring to FIG. 1, a digital still camera 1 in accordance with one embodiment of the invention comprises an acquisition block 2 consisting of a lens with diaphragm 3 and a sensor 4 onto which the lens focuses an image representative of a real scene.

The sensor 4, irrespective of whether it is of the CCD (Charge Coupled Device) type or the CMOS type, is an integrated circuit comprising a matrix of photosensitive cells, each of which generates a voltage proportional to the exposure to which it is subjected. The voltage generated by each photosensitive cell is translated into a digital value of N bits by an A/D converter 5. This value is generally represented by N=8, 10 or 12 bits. One could assume, but only by way of example and without thereby introducing any limitation whatsoever, that in this embodiment of the present invention we have N=8, i.e. that the analog voltages on the input side of the converter are encoded with digital values comprised between 0 and 255.

In a typical sensor, just a single photosensitive cell will be associated with each pixel. The sensor is covered by an optical filter consisting of a matrix of filtering elements, each one of which is associated with a photosensitive cell. Each filtering element transmits to the photosensitive cell associated with it the light radiation corresponding to the wavelength of nothing but red light, nothing but green light or nothing but blue light, absorbing only a minimal part of this radiation. For each pixel, it, therefore, detects only one of the three primary components (R,G,B) of additive chromatic synthesis.

The type of filter employed varies from one maker to another, but the one most commonly used is known as a Bayer filter. In this filter, the layout pattern of the filtering elements, the so-called Bayer Pattern, is identified by the matrix 10 shown in FIG. 2a.

In a sensor with a Bayer filter, the green component is detected for half the pixels of the sensor arranged in a chessboard pattern; the other two components are detected for the red and blue pixels, which are arranged on alternate lines.

The image on the output side of the A/D converter 5 is an incomplete digital image, because it is constituted by just a single component (R, G or B) per pixel. For this reason just a single digital value of N=8 bit is associated with each pixel. The format of this image is known as CFA (Color Filter Array).

The image in CFA format is sent to a pre-processing unit 6 ("Prepro"): this unit, which is active both before and during the entire acquisition phase, interacts with the acquisition block 2 and extracts from the CFA image a number of parameters, using them to perform some automatic control functions, namely automatic focusing, automatic exposure, correction of the sensor defects and white balancing.

Without introducing any limitation, one could assume that, in this unit, the image, following its acquisition, is subjected to the exposure correction method in accordance with the present invention.

The incomplete CFA image is subsequently sent to a unit 7 known as IGP (Image Generation Pipeline), which has the task of performing a complex processing phase with a view to obtaining a high-resolution digital image.

The core of the processing performed by the IGP 7 consists of the reconstruction process that, starting from the incomplete CFA image, produces a complete digital image—in RGB format, for example—in which three digital values (24 bits) corresponding to the components R, G, B are associated with each pixel. This transformation, obtained—for example—by means of interpolation, involves a passage from a representation on a single plane (Bayer), which nevertheless contains information relating to all three chromatic components, to a representation on three planes (R,G,B).

Various quality improvement functions are also performed in the IGP block 7, including for example: filtering of the noise introduced by the sensor 4, application of special effects and other functions that generally vary in both number and type from one maker to another.

The IGP block 7 is followed by a compression/encoding block 8, generally of the JPEG type. The compressed image can be saved in a memory unit 9 or sent to some external peripheral unit.

The correction method in accordance with the invention is applied directly to the CFA image, in which the regions considered to be important in perceptive or contextual terms are identified by means of visual analysis. This is followed by evaluation of the necessary correction and eventually application of the actual correction.

In particular, only the green pixels are involved in the visual analysis and the calculation of the correction. The reason for this is that the green pixels are the most numerous in the Bayer Pattern and also because the green component approximates the brightness or luminance of the image (channel Y).

Figure 2A:
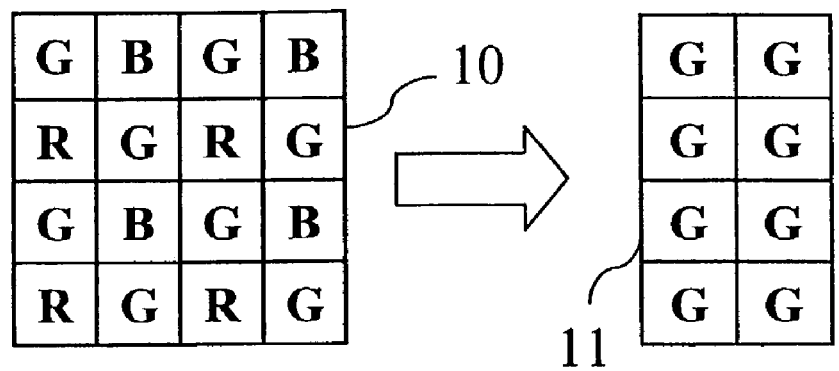
FIG. 2a shows the layout pattern of the filtering elements in a Bayer-type filter and the extraction process of the green plane in accordance with an embodiment of the invention.

The green plane G is extracted from the CFA image by eliminating the red and the blue pixels and placing the green pixels side by side in such a manner as to produce an image having half the size of the original (Matrix 11 of FIG. 2a). Obviously, this and all the intermediate processing operations are performed on a copy of the CFA source image, thus assuring that the information of the original image will neither be altered nor destroyed.

Subsequently the plane G is divided into K adjacent and non overlapping regions and by way of example we have here used K=16. For the sake of simplicity, the regions could be square matrices of the same size, but regions of any shape or size could equally be used.

Two statistical measures are then calculated for each region: a contrast measure and a focusing (or, more simply, focus). According to an embodiment of the present invention, indeed, the visually most important regions are the ones that have the best contrast and are well focused.

Contrast constitutes a measure of the difference of light tones present in the image; the regions with the greatest contrast have a strong visual impact. The focus, on the other hand, is a measure of the presence of sharp edges or sides in the region: it can be useful for identifying the regions in which there are concentrated the high-frequency components, that is to say, the regions of the image that contain the greatest details.

Obviously, if these two measures were to be computed for an under-exposed image, for example, the most strongly lit regions would have greater contrast and be better focused than the dark ones.

Figure 2B:
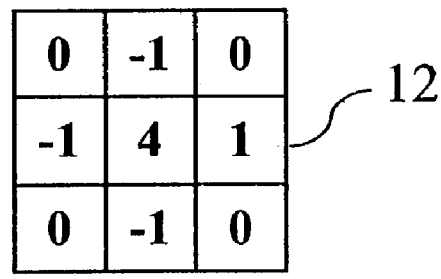
FIG. 2b shows the convolution matrix of a Laplace digital filter in accordance with an embodiment of the invention.
Figure 2C:
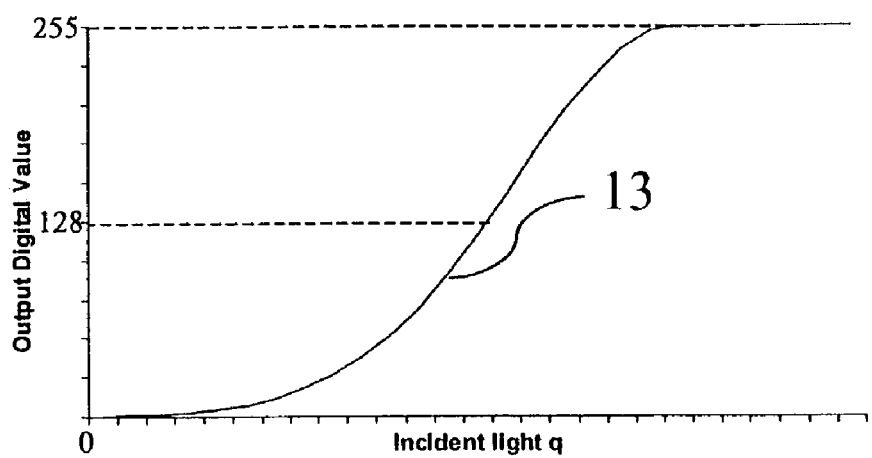
FIG. 2c shows the response function f(q) of a digital still camera in accordance with an embodiment of the invention, FIG. 3a provides a graphical illustration of the offset computation in accordance with an embodiment of the invention, and FIG. 3b provides a graphical illustration of the translation process of the green plane G in accordance with an embodiment of the invention.

But, visual analysis has to identify the most important regions independently of their illumination. For this reason, the measures of contrast and focus are computed for an intermediate image obtained by forcing the green plane G to a mean digital value substantially at the center of the range of the possible digital values (in this example: 128). This operation, which we shall call translation, involves a transformation of the plane G and calls for knowledge of the response function f(q) of the digital still camera (FIG. 2c).

The response function 13 expresses the relationship that exists between the quantity of light q(x,y) that strikes a photosensitive cell of coordinates (x,y) of the sensor and the digital value I(x,y) assigned to the corresponding pixel (x,y), i.e.:

$$I(x,y)=f(q(x,y)).$$

For the sake of simplicity, this function is commonly assumed to be the same for all the pixels.

As can be seen in FIG. 2c, the response function 13 has a threshold region, a saturation region and a linear region comprised between the threshold region and the saturation region.

For a given acquisition device the function f(q) is calculated once and for all as part of the calibration phase.

The actual calculation process forms part of the state of the art and will not be further considered herein. Two different methods of determining the response function are, however, set out in detail in "Recovering High Dynamic Radiance Maps from Photographs" (P. Debevec, J. Malik, 1997, Proc. Of ACM SIGGRAPH) and in U.S. Pat. No. 5,828,793 (Mann).

In actual practice, however, it is not necessary for the response function f(q) to be known with great accuracy: experimental trials have shown that good results can be obtained also with generic functions f(q) whose trend is substantially similar to that of the function shown in FIG. 2c.

The translation operation of the green plane is commenced by calculating MeanG, i.e. the mean of the digital values of the green pixels. One then selects a digital value (Mean) that is to represent the new mean value of the green plane after the translation operation, say, Mean=128.

Figure 3A:
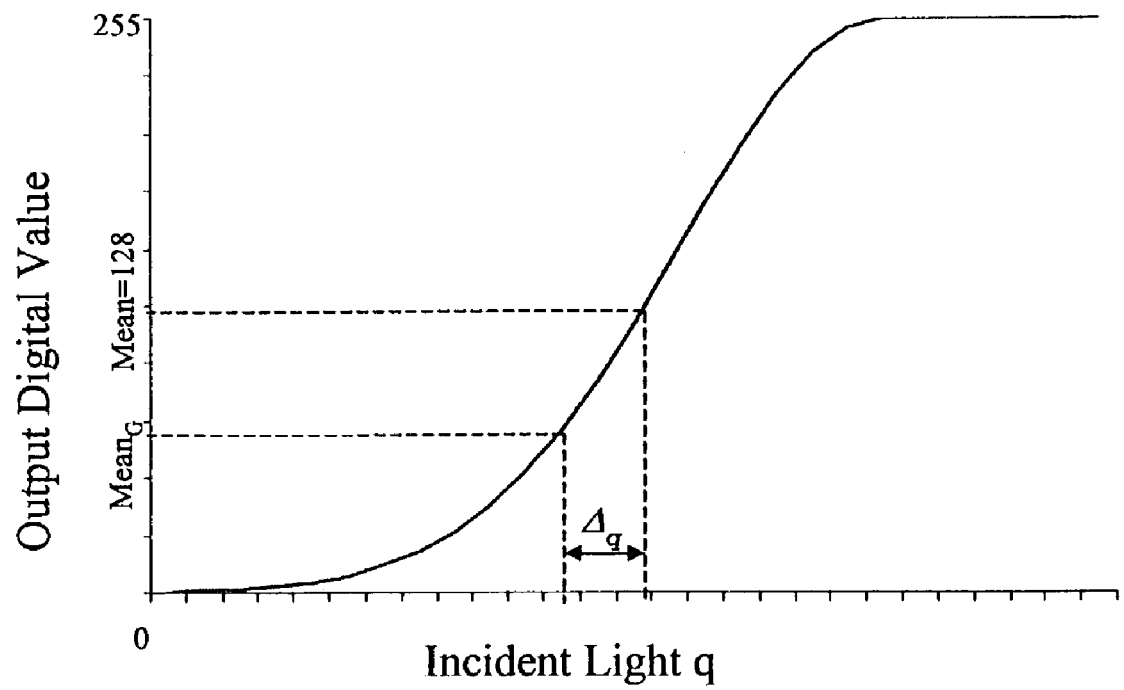

Inverting the response function f(q), one then determines the quantity $\Delta_q$ that, always in terms of q, represents the offset (FIG. 3a) needed to make the mean value of the green plane substantially coincide with Mean, i.e.:

$$\Delta_q = f^{-1}(\text{Mean}_g) - f^{-1}(\text{Mean}).$$

Once the offset $\Delta_q$ has been obtained, the digital value G(x,y) of the green pixels is modified by the translation operation into the digital value $G^T(x,y)$ in accordance with the following formula:

$$G^T(x,y) = f(\Delta_q + f^{-1}(G(x,y))).$$

Figure 3B:
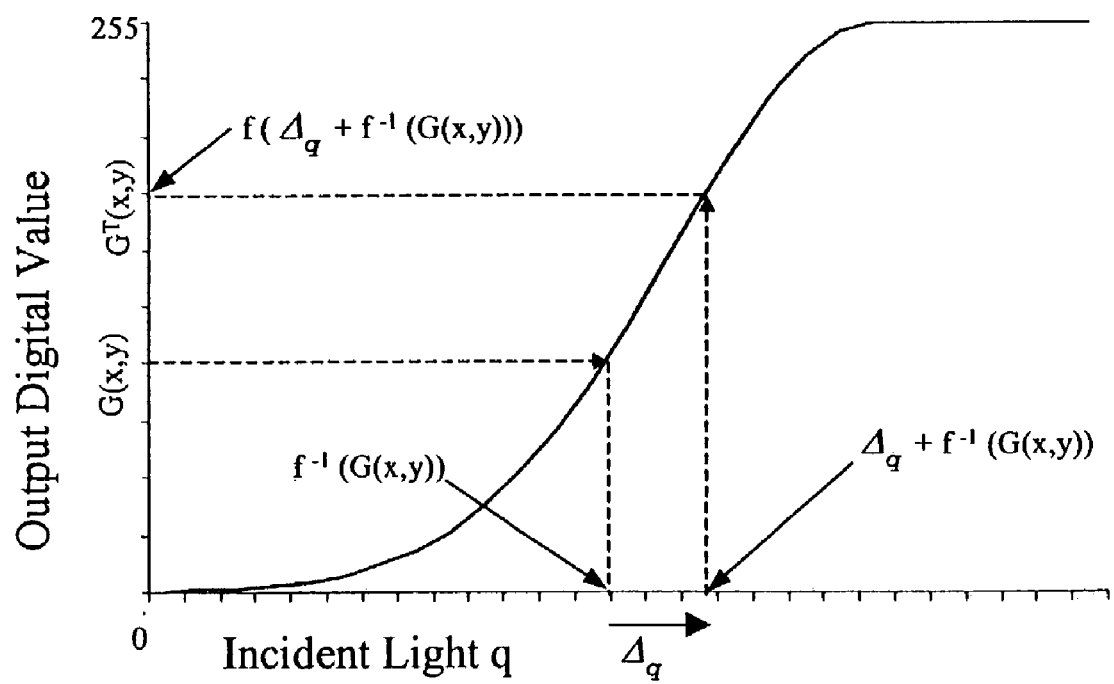

The translation operation is schematically illustrated in FIG. 3b.

Following the translation, one obtains a new green plane $G^T$, which has the characteristic of being representative of the same real scene of the green plane G of the source image.

The plane $G^T$ is, likewise, subdivided into K regions and reflects the subdivision of the green plane G of the source image.

For each of the regions of the plane $G^T$, one then calculates a contrast measure. For any given region, this is obtained by constructing the histogram of the intensities $G^T=i$ (i=0 . . . 255) of the pixels and evaluating the deviation D from the mean value M of the histogram.

The histogram is a discrete function I[i] of the digital values i (i=0 . . . 255) that associates with each digital value i the number of green pixels with which the digital value i is associated. The deviation D from the mean value of the histogram is calculated on the basis of the following formula:

$$D = \frac{\sum_{i=0}^{255} |i - M|}{\sum_{i=0}^{255} I[i]}$$

where M is the mean value of the histogram, i.e.:

$$M = \frac{\sum_{i=0}^{255} (i * I[i])}{\sum_{i=0}^{255} I[i]}$$

Since a large deviation indicates strong contrast, the deviation represents a good measure D of the contrast of the region in question.

A possible variant consists of filtering the histogram in such a manner as to eliminate possible and unimportant peaks before calculating the deviation D. In practice a simple filtering of this type can be obtained by replacing each value of the histogram by the mean of this value and a certain number of adjacent values.

Once the measures D have been obtained for all the regions, they are normalized in the range [0;1] by assigning the value 1 to the largest measured D.

A focus measure F is assigned to the K regions by filtering each region of $G^T$ with a digital high-pass filter.

The measure F, for a given region, is calculated as the mean of the filtered pixels forming part of the region. With a view to eliminating some high-frequency noise components, it is also possible to exclude from the mean all the pixels having a filtered value in excess of some arbitrary threshold. The digital high-pass filtering can be obtained, for example, by performing the convolution of each region with a 3×3 Laplace filter, which is indicated by the matrix 12 in FIG. 2b.

After once again normalizing the quantity F in the range [0;1], one then calculates the quantity V, which represents an index of visual importance, i.e.:

$$V = \alpha \times D + (1-\alpha) \times F$$

where α is any real number between 0 and 1.

The regions in which the index V exceeds a predetermined threshold (for example, $V_t$=0.5) are classified as visually important.

This basic approach can give rise to several variants: for example, it would be possible to include in V an additional weighting coefficient for the regions that occupy central positions of the scene, because very often these contain the principal subject of the photograph. A further refinement consists of discarding all the saturated or very noisy regions or adding some other statistical measure indicative of the perceptive importance of the region.

Once the important regions have been identified, the correction operation in the proper sense of the term can be performed. This operation is once again a translation, but this time, it involves the whole of the CFA image. The translation is performed in such a way as to make the mean value of the green pixels of the important regions coincide substantially with the center of the range of the possible digital values in accordance with the definition of optimal exposure described above.

To this end, one calculates the mean $Mean_{gV}$ of the digital values of the green pixels of the non-translated plane G of all the important regions and then determines the offset $\Delta_{qV}$ needed to correct the exposure of the image in such a manner that the green components of the important regions will have a mean value $Mean_v$ substantially coincident with the center of the range of the possible digital values, i.e.:

$$\Delta_{qV} = f^{-1}(Mean_{gV}) - f^{-1}(Mean_V).$$

Once $\Delta_{qV}$ is known, the whole of the CFA image, inclusive of the red and the blue pixels, can be corrected by performing a translation operation that is in every respect similar to the method described above.

More precisely, if we use the letter P to designate the matrix P(x,y) that constitutes the source image in CFA format, the digital values $P^T(x,y)$ of the corrected CFA image $P^T$ are obtained performing the following translation:

$$P^T(x,y) = f(\Delta_{qV} + f^{-1}(P(x,y))).$$

For some types of images, however, a single correction might not prove sufficient: in these cases optimal final results can be obtained by applying the correction method several times. This is due to the fact that image correction also improves the identification of the important regions that were initially subject to incorrect exposure and thus renders the next correction step more efficacious.

The proposed method, thus, makes it possible to correct the acquired CFA images, either in a single step or in several steps, before these images are interpolated, producing final images in which the reproduction of the more important parts is improved. Since an interpolated image occupies three times as much memory space as a CFA image, the method in accordance with an embodiment of the present invention obtains a considerable saving in terms of memory occupation, computation time and energy consumption.

The invention claimed is:

1. A method for improving the quality of a digital image, the digital image comprising a matrix P of digital values P(x,y), or pixels, each of which is associated on the basis of the position (x,y) with a chromatic component of the red, green or blue type, each of said digital values forming part of a range of possible digital values comprised between a maximum and a minimum number, said method comprising the following operations:

establishing a response function f that expresses a relationship between the digital values P(x,y) of the image P and a measure q(x,y) of the quantity of light that produced said digital values, extracting from the image P the matrix G of the pixels associated with the green chromatic component obtained from P by discarding the pixels associated with the red and the blue component, subdividing P into a plurality of adjacent and not overlapping regions, selecting the visually important regions of G, establishing a digital value $Mean_v$ substantially at the center of the range of the possible digital values, modifying the image P to obtain a corrected image $P^T$ by performing a translation of the digital values of P by means of the inverting the response function f in such a manner as to make the mean of the digital values of G forming part of the important regions coincide with $Mean_v$, characterized in that the important regions of G are selected by performing the following sequence of operations:

establishing a digital value $Mean_v$ substantially at the center of the range of the possible digital values, obtaining from the plane G a plane $G^T$ by performing a translation of the digital values of G by inverting the response function f in such a manner as to make the mean of the pixels of G substantially coincide with Mean, subdividing the plane $G^T$ into regions corresponding to the regions of G, assigning to every region of G an index of visual importance V calculated on the basis of at least one contrast measure D and at least one focus measure F of the pixels of the corresponding region $G^T$, establishing a threshold value $V_t$, and selecting the regions of G whose index of visual importance V is greater than $V_t$.

2. A method in accordance with claim 1, wherein the digital image P(x,y) is a CFA image in Bayer format.

3. A method in accordance with claim 1 wherein the planes G and GT are subdivided into square matrices of equal size.

4. A method in accordance with claim 1 wherein the contrast measure D for a given region is the deviation of the histogram of the distribution of the digital values of $G^T$ forming part of said region.

5. A method in accordance with claim 1 wherein the focus measure F for a given region is obtained by filtering the digital values of $G^T$ forming part of said region with a digital high-pass filter and determining the mean of said filtered digital values.

6. A method in accordance with claim 5, wherein the digital high-pass filtering is obtained by performing the convolution of the region with a 3×3 Laplace filter.

7. A method in accordance with claim 5 wherein the digital values that exceed a certain threshold after filtering are excluded from the mean.

8. A method in accordance with claim 1 wherein the measures F and D are normalized in the range [0;1] and the index V is calculated as:

$$V = \alpha \times D + (1-\alpha) \times F$$

where α is any real number between 0 and 1.

9. A method in accordance with claim 1 wherein the index V is calculated by including an additional coefficient for the regions that occupy central positions of the digital image.

10. A camera for generating a digital image of a scene, the camera comprising:

a sensor array operable to acquire pixels of the image having a plurality of regions; and a processor circuit operable to, calculate a respective contrast value and a respective focus value for each of the regions of the image, and to identify at least one of the regions as visually important based on the corresponding contrast and focus values.

11. The camera of claim 10 wherein the sensor array is operable to acquire the image in a color-filter-array format.

12. The camera of claim 10 wherein the processor circuit is operable to exclude predetermined pixels from the calculation of the respective contrast value and the respective focus value for the region.

13. The camera of claim 10 wherein the processor circuit is operable to calculate a respective contrast value for each region of the image by:
    calculating a histogram for the region;
    calculating a mean of the histogram; and
    calculating the contrast value equal to the deviation from the mean of the histogram.

14. The camera of claim 10 wherein the processor circuit is operable to calculate a respective focus value for each region of the image by:
    high-pass filtering the pixels within the region; and
    calculating the focus value equal to the mean of the filtered pixels.

15. The camera of claim 14 wherein the processor circuit is operable to high-pass filter the pixels by convoluting the region with a 3×3 LaPlace filter.

16. The camera of claim 10 wherein the sensor array comprises filter elements arranged in a Bayer pattern.

17. The camera of claim 10 wherein the sensor array comprises a charge-coupled-device sensor.

18. The system of claim 10 wherein the sensor array comprises a CMOS-type sensor array.

19. A method for improving the quality of a digital image, the method comprising:
    acquiring a digital image having a plurality of pixels arranged in a matrix;
    subdividing said matrix into a plurality of regions;
    calculating a contrast value and a focus value for each of said regions;
    calculating, for each of said regions, an index of visual importance as a function of both said contrast value and said focus value calculated for said region, and assigning said index to the respective region;
    selecting, based on said index, at least one of said regions as a visually important region of the image and identifying pixels belonging to said at least one visually important region as the visually important pixels of the image; and
    modifying each of said plurality of pixels of said matrix based on a characteristic of the pixels identified as visually important.

20. The method of claim 19 wherein acquiring the digital image comprises acquiring a color filter array of the image.

21. The method of claim 19 wherein modifying each of the plurality of pixels comprises:
    calculating the mean of the visually important pixels;
    determining a difference between the mean of the visually important pixels and a desired mean; and
    shifting each of the plurality of pixels by the difference.

22. A method, comprising:
    extracting the green pixels from a color-format-array image having multiple regions to generate a green image plane having corresponding regions;
    shifting the pixels of the green image plane such that the green pixels have a desired mean;
    for each corresponding region of the green image plane,
        calculating a histogram,
        calculating the mean of the histogram,
        calculating a contrast value D equal to the deviation from the mean of the histogram;
        high-pass filtering the pixels in the region, and
        calculating a focus value F equal to the mean of the filtered pixels;
    normalizing the contrast values for the corresponding regions of the green plane;
    normalizing the focus values for the corresponding regions of the green plane;
    calculating a respective visual-importance value $V=\alpha D+(1-\alpha)F$ for each corresponding region of the green plane;
    comparing each value V to a threshold to identify at least one visually important region of the image;
    calculating the amount of shift needed to cause the green pixels of the at least one visually important region to have a desired mean; and
    shifting the pixels of the image by the calculated amount.

* * * * *